United States Patent
Abo

[11] Patent Number: 5,157,993
[45] Date of Patent: Oct. 27, 1992

[54] HYBRID CONTINUOUSLY VARIABLE TRANSMISSION WITH ELECTRONICALLY CONTROLLED CLUTCH

[75] Inventor: Keiju Abo, Yokosuka, Japan

[73] Assignee: Nissan Motor Co., Ltd., Yokohama City, Japan

[21] Appl. No.: 544,865

[22] Filed: Jun. 28, 1990

[30] Foreign Application Priority Data

Jul. 24, 1989 [JP] Japan .................................. 1-188909

[51] Int. Cl.⁵ .......................................... B60K 41/12
[52] U.S. Cl. ................................................. 74/867
[58] Field of Search ................................... 74/867

[56] References Cited

U.S. PATENT DOCUMENTS

| | | | |
|---|---|---|---|
| 4,648,496 | 3/1987 | Petzold et al. | 192/76 |
| 4,682,518 | 7/1987 | Takada et al. | 74/867 |
| 4,718,308 | 1/1988 | Haley | 74/866 |
| 4,827,805 | 5/1989 | Moan | 74/866 X |
| 4,843,918 | 7/1989 | Morimoto | 74/866 |
| 4,890,516 | 1/1990 | Suzuki | 74/866 |
| 4,895,552 | 1/1990 | Abo et al. | 474/28 |
| 4,907,471 | 3/1990 | Ishimaru | 74/745 |
| 4,955,260 | 9/1990 | Oshidari | 74/866 X |

*Primary Examiner*—Rodney H. Bonck
*Assistant Examiner*—Ryan W. Massey
*Attorney, Agent, or Firm*—Foley & Lardner

[57] ABSTRACT

A hybrid continuously variable transmission includes a clutch which effects a shift from a power train through a gearing mechanism to another power train through a continuously variable transmission mechanism. A duty soleonid is provided to control the supply of hydraulic fluid to and discharge thereof from the above-mentioned clutch under the control of a control unit.

9 Claims, 5 Drawing Sheets

HYBRID CONTINUOUSLY VARIABLE TRANSMISSION WITH ELECTRONICALLY CONTROLLED CLUTCH

RELATED APPLICATIONS

U.S. patent application Ser. No. 07/278,887 filed on Dec. 2, 1988, now U.S. Pat. No. 4,907,471;

U.S. patent application Ser. No. 07/348,837 filed on May 8, 1989, now pending;

U.S. patent application Ser. No 07/330,919 filed on Mar. 31, 1989, now pending;

U.S. patent application Ser. No. 07/330,918 filed on Mar. 31, 1989, now U.S. Pat. No. 4,895,552;

U.S. patent application Ser. No. 07/489,058 filed on Mar. 7, 1990, now U.S. Pat. No. 4,955,260.

BACKGROUND OF THE INVENTION

The present invention relates to a hybrid continuously variable transmission.

U.S. patent application Ser. No. 07/330,918 filed on Mar. 31, 1989 by Abo et al., now U.S. Pat. No. 4,895,552 issued on Jan. 23, 1990, discloses a hybrid continuously variable transmission. This previously proposed transmission has two power trains between an input shaft and an output shaft, which are selectively rendered operable to establish a desired reduction ratio between the input and output shafts.

When it is rendered operable, a first one of the two power trains provides a single reduction ratio which is fixed. A second one or the other of the two power trains, when it is rendered operable, provides a reduction ratio which is continuously variable over a predetermined range. More specifically, the known hybrid continuously variable transmission including a gearing mechanism combined with a V-belt type continuously variable transmission mechanism. A first clutch, namely a low clutch, and a second clutch, namely a high clutch, are provided. When the low clutch is engaged with the high clutch disengaged, an engine power is delivered by the gearing mechanism, while when, with the low clutch kept engaged, the high clutch is engaged, the engine power is delivered by the V-belt type continuously variable transmission. A shift from the power delivery state by the gearing mechanism to the power delivery state by the V-belt continuously variable transmission mechanism is effected by engaging the high clutch. Although the high clutch is engaged with the low clutch kept engaged, a one-way clutch is released to interrupt delivery of power from the gearing mechanism to the output shaft. Thus, this shift is made smoothly owing to the action of the one-way clutch.

The V-belt type continuously variable transmission mechanism includes a driver pulley with a driver pulley cylinder chamber, a follower pulley with a follower pulley cylinder chamber, and a V-belt drivingly interconnecting the driver and follower pulleys. For controlling the continuously variable transmission, a hydraulic fluid pressure acting within the driver pulley cylinder chamber is varied by a shift control valve. The shift control valve includes a spool which is operated via a shift operating mechanism by a shift motor in the form of a stepper motor under the control of a microcomputer controlled unit. With this arrangement, the hydraulic fluid pressure within the driver pulley cylinder chamber assumes different values each corresponding to one of different positions which can be taken by the stepper motor. This hydraulic fluid pressure variable by the stepper motor is admitted to the high clutch.

As mentioned above, the high clutch is activated by the same hydraulic fluid pressure acting within the driver pulley cylinder chamber and thus controlled by the stepper motor. In other words, a rate of increase in the hydraulic fluid pressure admitted to the high clutch is determined by a speed at which the stepper motor rotates. Thus, it is very difficult to increase the hydraulic fluid pressure admitted to the high clutch at a rate gradual enough to suppress a shift shock to a satisfactorily low level.

If, during a panic braking, a quick downshift and a quick disengagement of the high clutch are required, it takes a considerable time until the high clutch is disengaged since the hydraulic fluid pressure acting within the high clutch does not drop to a sufficiently low level until the stepper motor rotates in a downshift direction to a predetermined position. Since it is subject to slip during this transient period, the V-belt wears at a quick rate, resulting in degraded endurability and shortened service life.

An object of the present invention is to improve a hybrid continuously variable transmission such that a clutch which controls a shift between two power train drive states is engaged without any substantial shock and is disengaged quickly when so required.

SUMMARY OF THE INVENTION

According to the present invention, there is provided a control system for a hybrid continuously variable transmission, the hybrid continuously variable transmission including a gearing mechanism combined with a continuously variable transmission mechanism, the hybrid continuously variable transmission also including a first clutch and a second clutch, wherein when the first clutch is engaged with the second clutch disengaged, a first power train is established by the gearing mechanism, while when the second clutch is engaged, a second power train is established by the continuously variable transmission mechanism, the control system comprising means for generating a hydraulic pressure; and electronically controlled means connected to said hydraulic pressure generating means and the second clutch for controlling a supply of hydraulic fluid to and discharge thereof from the second clutch.

DETAILED DESCRIPTION OF THE INVENTION

Figure 1:
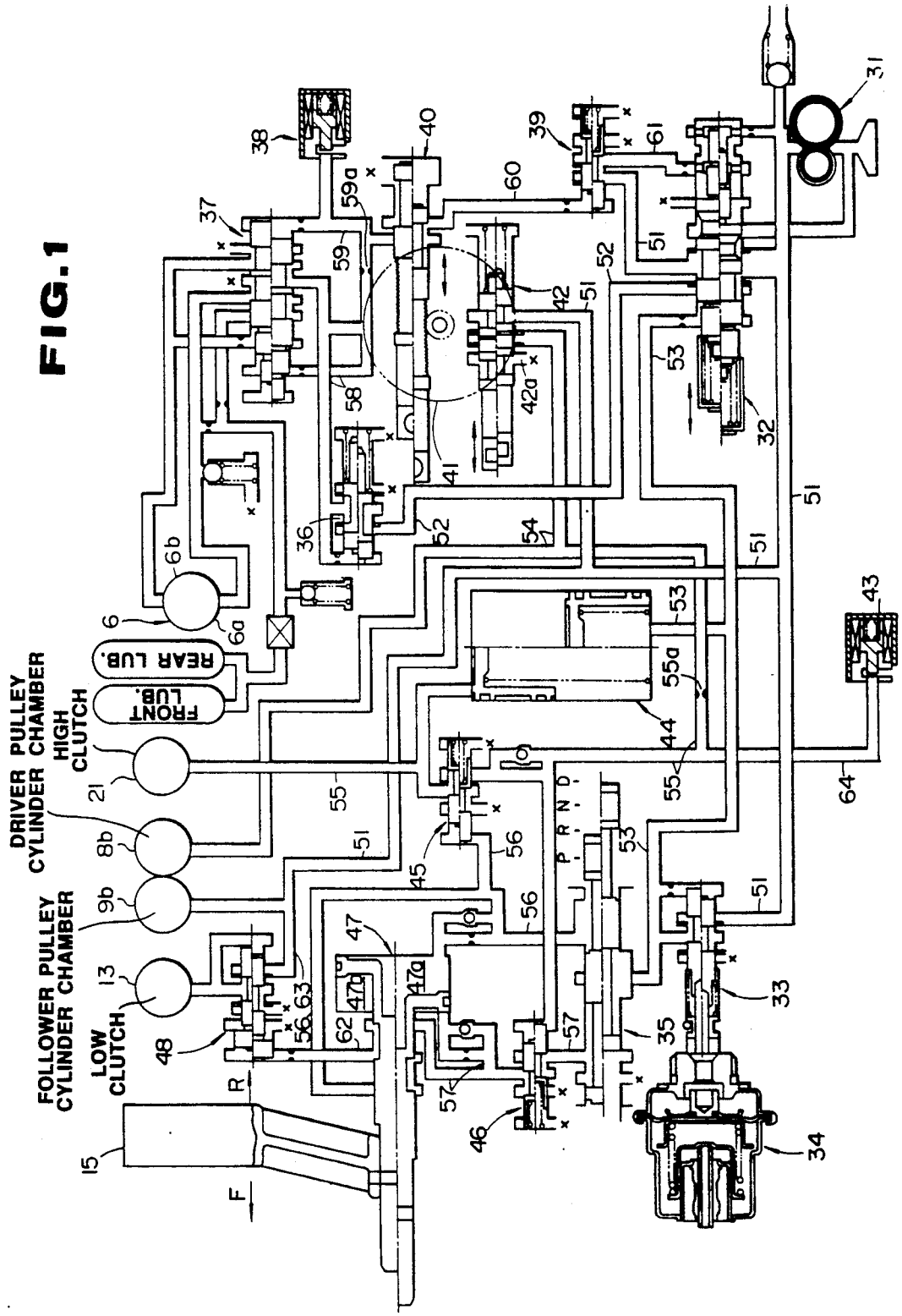
FIG. 1 is a hydraulic circuit illustrating a hydraulic control system for a hybrid continuously variable transmission.
Figure 2:
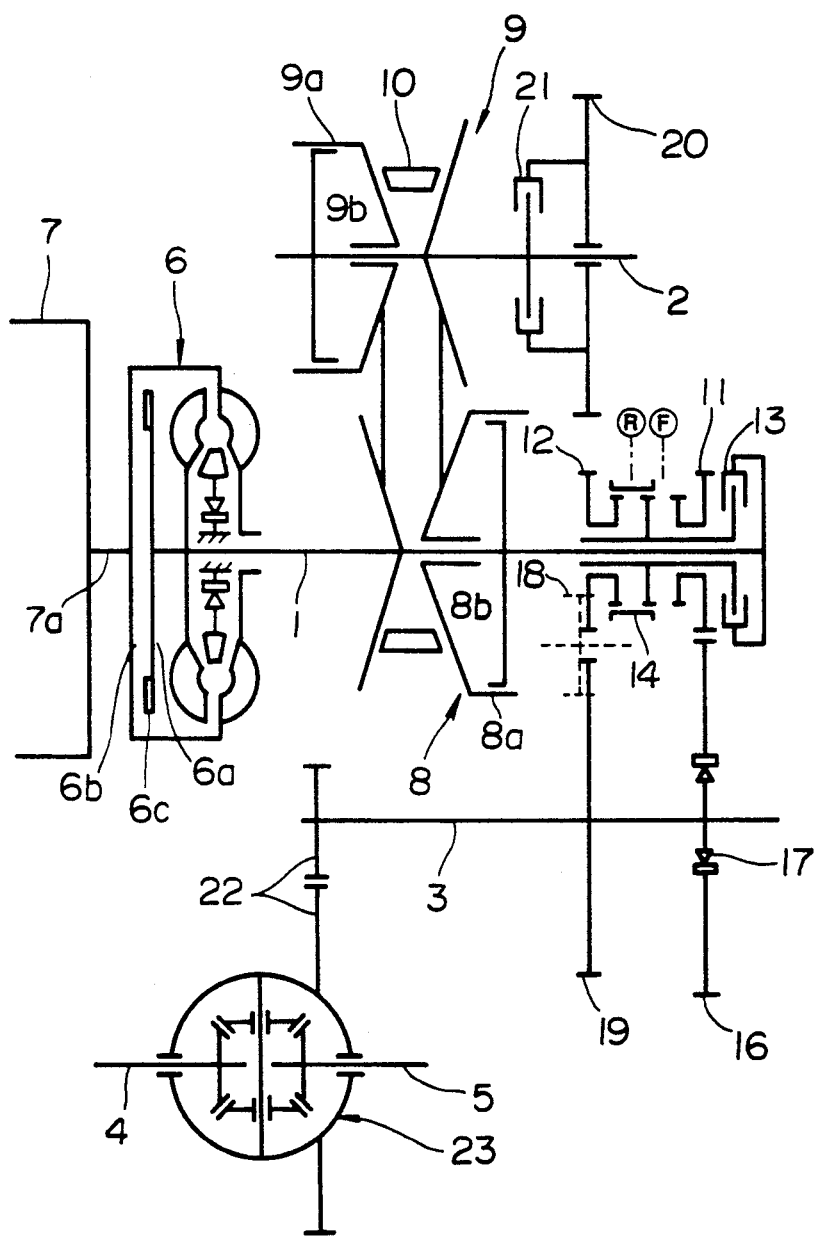
FIG. 2 is a diagram of the hybrid continuously variable transmission with an engine for a motor vehicle and a differential.
Figure 3:
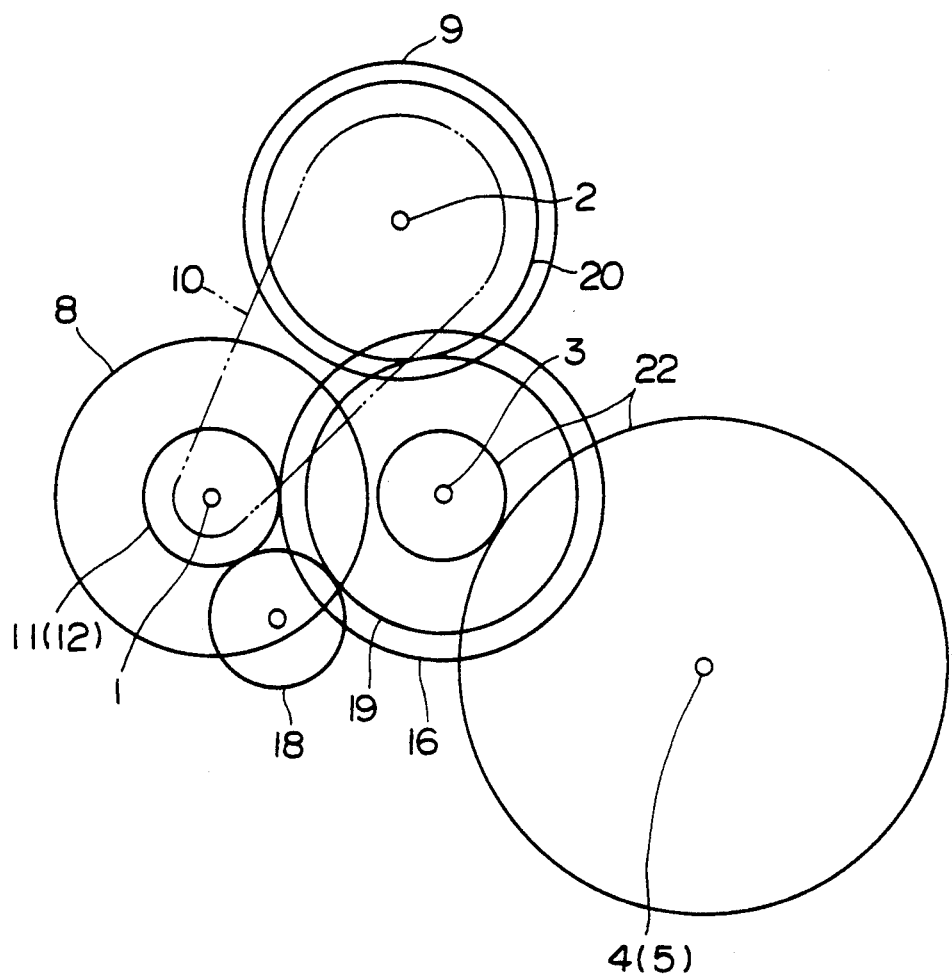
FIG. 3 is a diagram, viewing FIG. 2 from the left, illustrating the arrangement of various rotary members.

Referring to the accompanying drawings, and particularly to FIGS. 2 and 3, a hybrid continuously variable transmission to be controlled by a hydraulic control system shown in FIG. 1 is described.

In FIGS. 2 and 3, the hybrid continuously variable transmission has an input shaft 1, a counter shaft 2, and an output shaft 3. Also shown are a pair of axles 4 and 5. The above-mentioned rotary member or shafts are arranged as shown in FIG. 3. The input shaft 1 is drivingly connected to a turbine of a torque converter 6 whose pump is drivingly connected to a crankshaft 7a of an engine 7 of a motor vehicle. The torque converter 6 is of the lock-up type including a lock-up clutch 6c. The lock-up clutch 6c is engaged when a hydraulic fluid is supplied to an apply chamber 6a and discharged from a release chamber 6b. Engagement of the lock-up clutch 6c causes the torque converter 6 to lock up. When hydraulic fluid is supplied to the release chamber 6b and discharged from the apply chamber 6a, the lock-up clutch 6c is disengaged. Disengagement of the lock-up clutch 6c causes the torque converter 6 to operate in its converter state.

Coupled with the input shaft 1 and the counter shaft 2 are a driver pulley 8 and a follower pulley 9. These pulleys 8 and 9 are interconnected by a V-belt 10. The driver pulley 8 has an axially displaceable conical disc or flange 8a and a driver pulley cylinder chamber 8b, while the follower pulley 9 has an axially displaceable conical disc or flange 9a and a follower pulley cylinder chamber 9b. The follower pulley cylinder chamber 9b is always supplied with a line fluid pressure generated by a regulator valve 32 (see FIG. 1), while the driver pulley cylinder chamber 8b is supplied with a hydraulic fluid pressure generated by a shift control valve 42 (see FIG. 1). This hydraulic fluid pressure is variable by a shift motor in the form of a stepper motor 41 and thus may be called as "a stepper motor controlled pressure." A speed ratio between a speed of rotation of the driver pulley 8 and that of the follower pulley 9 is continuously varied by varying the level of hydraulic pressure supplied to the driver pulley cylinder chamber 9b by rotating the stepper motor 41.

Rotatably mounted on the input shaft 1 are a low gear 11 and a reverse gear 12. The low gear 11 is connectable to the input shaft 1 when the low clutch 13 is engaged with a coupling sleeve 14 placed at a forward (F) position. The reverse gear 12 is connectable to the input shaft 1 when the low clutch 13 is engaged with the coupling sleeve 14 placed at a reverse (R) position. The coupling sleeve 14 is shiftable between the F position and R position by a shift fork 15 (see FIG. 1). The low gear 11 is in constant mesh with an output gear 16 which is coupled via a one-way clutch 17 with the output shaft 3. The reverse gear 12 is in constant mesh with an idler gear 18 that is in turn in constant mesh with an output gear 19 fixedly coupled with the output shaft 3.

A high gear 20 is rotatable about the counter shaft 2. This high gear 20 is connectable to the counter shaft 2 by a high clutch 21. The high gear 20 is in constant mesh with the output gear 19 (see FIG. 3). A gear ratio between the high gear 20 and the output gear 19 is 1:1. The output shaft 3 is drivingly connected to the axles 4 and 5 via a final gearing 22 and a differential gear 23.

The operation is explained.

The input shaft 1 is always subject to an engine power supplied thereto from the engine 7 via the torque converter 6. For forward travel, the low clutch 13 is engaged and the coupling sleeve 14 is placed at the F position. Under this condition, a rotation of the input shaft 1 is transmitted via the low clutch 13, coupling sleeve 14, low gear 11, output gear 16, one-way clutch 17 to the output shaft 3. Then it is transmitted via the final gearing 22, differential gear 23 to the axles 4 and 5, driving the axles 4 and 5 in the forward rotational direction. From the above description, it is appreciated that the rotation of the input shaft 1 is delivered to the output shaft 3 by the gearing mechanism including the low clutch 13, coupling sleeve 14, low gear 11, output gear 16, and one-way clutch 17. In other words this gearing mechanism establishes a power train between the input and output shafts 1 and 3. When this power train is rendered operable, the maximum or largest reduction ratio is established between the input shaft 1 and the output shaft 3. Thus, the motor vehicle can move off from a standstill.

After the vehicle has started moving, the high clutch 21 is also engaged. Transmission of the rotation via the driver pulley 8, V-belt 10, follower pulley 9, counter shaft 2, high clutch 21, high gear 20, and output gear 19 becomes effective and thus begins. The maximum or largest reduction ratio established by this power train is smaller than the reduction ratio established by the gearing mechanism mentioned above. The output shaft 3 is driven by the output gear 19 at a speed higher than a speed at which the output gear 16 rotates. This difference in rotation between the output shaft 3 and the output gear 16 is allowed by the one-way clutch 17. Thus, upon engagement of the high clutch 21, the transmission of rotation via the gearing mechanism to the output shaft 3 is interrupted or rendered inoperable and the transmission of rotation via the continuously variable transmission mechanism to the output shaft 3 is established or rendered operable. After this shift, the reduction ratio can be continuously varied by varying the level of hydraulic fluid pressure supplied to the driver pulley cylinder chamber 8b.

For reverse travel, the low clutch 13 is engaged and the coupling sleeve 14 is placed at the R position. Under this condition, the rotation of the input shaft 1 is transmitted via the low clutch 13, coupling sleeve 14, reverse gear 12, idler gear 18, output gear 19 to the output shaft 3. The output shaft 3 is rotated in the reverse direction, causing the axles 4 and 5 to rotate in the reverse direction.

Referring to FIG. 1, the hydraulic control system is explained. The hydraulic control system comprises the following elements:

A pump 31;
A regulator valve 32;
A throttle valve 33;
A vacuum diaphragm 34;
A manual valve 35;
A torque converter regulator valve 36;
A lock-up control valve 37;
A lock-up solenoid valve 38;
A servo valve 39;
A shift command valve 40;
A shift motor 41 (or a stepper motor);
A shift control valve 42;
A high clutch duty solenoid 43;
A high clutch accumulator 44;
A neutral valve 45;
A reverse inhibitor valve 46;
A shift fork 15;
A shift valve 47 for displacing the shift fork 15;
A forward/reverse switch detector valve 48. The above-listed elements are connected to the clutches 13, 21, torque converter 6 and pulley cylinders 8b and 9b in the manner as illustrated in FIG. 1.

A hydraulic fluid discharged into a hydraulic fluid line 51 by the pump 31 is regulated by the regulator valve 32 to a so-called line pressure. An overabundance of hydraulic fluid discharged by the regulator valve 32 during its regulating action is allowed to flow into a hydraulic fluid line 52 and then supplied to the torque converter 6. Via the hydraulic fluid line 51, the line pressure is transmitted to the throttle valve 33. This throttle valve 33 is operative responsive to the vacuum diaphragm 34 that is subject to an engine intake vacuum to generate a throttle pressure variable in proportion to the magnitude of the engine load. The throttle pressure is supplied to a hydraulic fluid line 53. The line pressure within the hydraulic fluid line 51 is transmitted to the follower pulley cylinder chamber 9b and the shift control valve 42. The shift control valve 42 is operated by the stepper motor 41 and controls, via a hydraulic fluid line 54, supply of hydraulic fluid to and discharge thereof from the driver pulley cylinder chamber 8b.

The throttle pressure within the hydraulic fluid line 53 is transmitted to the regulator valve 32 where it is used as a bias in regulating the line pressure. It is also transmitted to the backup chamber of the high clutch accumulator 44 and the manual valve 35. The manual valve 35 is manually shiftable to a park (P) position, a reverse (R) position, a neutral (N) position, a forward automatic drive (D) position, and an engine braking position (not shown). When it is placed at the D position, the manual valve 35 allows a hydraulic fluid line 56 to communicate with the hydraulic fluid line 53, allowing the throttle pressure to appear in the hydraulic fluid line 56. In this position of the manual valve 35, a hydraulic fluid line 57 is drained. When it is placed at the R position, the manual valve 35 allows the hydraulic fluid line 57 to communicate with the hydraulic fluid line 53, allowing the throttle pressure to appear in the hydraulic fluid line 57. In this position of the manual valve 35, the hydraulic fluid line 56 is drained. When the manual valve 35 is placed at the other positions, both of the hydraulic fluid lines 56 and 57 are drained.

The torque converter regulator valve 36 is supplied with the hydraulic fluid from the hydraulic fluid line 52 and generates a constant pressure. This constant pressure is transmitted via a hydraulic fluid line 58 to the lock-up control valve 37. Connected via an orifice 59a to the hydraulic fluid line 58 is a solenoid controlled pressure line 59 having a drain port controlled by the lock-up solenoid valve 38. This pressure line 59 leads to the shift command valve 40 and a righthand, viewing in FIG. 1, chamber of the lock-up control valve 37. When it is turned OFF or deenergized, the lock-up solenoid valve 38 closes the drain port, allowing a constant hydraulic pressure as high as that within the hydraulic fluid line 58 to prevail in the solenoid controlled pressure line 59. This causes the lock-up control valve 37 to assume a position as illustrated by a lower half thereof viewing in FIG. 1. The lock-up control valve 37 assumes a position as illustrated by an upper half thereof viewing in FIG. 1 when the lock-up solenoid valve 38 is turned ON or energized to drain the solenoid controlled pressure line 59.

When the lock-up control valve 37 assumes the so-called converter position as illustrated by the lower half thereof viewing in FIG. 1, the hydraulic fluid from the hydraulic fluid line 58 is allowed to flow into a release pressure chamber 6b of the torque converter 6, and the hydraulic fluid is discharged from an apply pressure chamber 6a toward front and rear portions to be lubricated. Thus, the torque converter 6 is kept at the converter state. When the lock-up control valve 37 assumes the lock-up position as illustrated by the upper half thereof viewing in FIG. 1, the hydraulic fluid from the hydraulic fluid line 58 is allowed to flow into the apply chamber 6a of the torque converter 6, while the release chamber 6b is drained. This causes the torque converter 6 to assume the lock-up state.

When the shift command valve 40 is placed at an overstroke position as illustrated by an upper half thereof viewing in FIG. 1, a hydraulic fluid line 60 leading to the servo valve 39 is drained, causing the servo valve 39 to assume a position as illustrated by the lower half thereof viewing in FIG. 1. When the servo valve 39 assumes this position, a hydraulic fluid line 61 leading to the regulator valve 32 is allowed to communicate with the hydraulic fluid line 51, allowing the line pressure to act on the regulator valve 32 via the hydraulic fluid line 61. When the shift command valve 40 has moved from the overstroke position as illustrated by the upper half thereof to the left, the hydraulic fluid line 60 is allowed to communicate with the solenoid controlled pressure line 59. After this fluid communication has been established, the servo valve 39 is controlled by the lock-up solenoid valve 38 such that the servo valve 39 assumes a position as illustrated by the upper half thereof viewing in FIG. 1 to drain the hydraulic fluid line 61 when the lock up solenoid valve 38 is deenergized (OFF) to render the converter 6 operable in the converter state, while it assumes the position as illustrated by the lower half thereof viewing in FIG. 1 to allow the line pressure to act on the regulator valve 32 via the hydraulic fluid line 61 when the lock-up solenoid valve 38 is energized (ON).

The hydraulic fluid lines 56 and 57 communicate with chambers 47a and 47b of the shift valve 47, respectively. This shift valve 47 causes the shift fork 15 to stroke. Besides, the shift valve 47 functions to connect a hydraulic fluid line 62 from the forward/reverse switch detector valve 48 to the hydraulic fluid line 56 or the hydraulic fluid line 57, selectively.

The forward/reverse switch detector valve 48 is fluidly disposed in a hydraulic fluid line 63 branching off from the hydraulic fluid line 51 and extending toward the low clutch 13, and it allows the low clutch 13 to be engaged in response to the presence of hydraulic fluid pressure within the hydraulic fluid line 62.

Fluidly disposed in a high clutch pressure line 55 is the neutral valve 45. This neutral valve 45 opens the fluid line 55 to allow the hydraulic pressure to act on the high clutch 21 in response to the presence of the hydraulic pressure within the hydraulic fluid line 56. Connected to a portion of the hydraulic fluid line 55 disposed downstream of the neutral valve 45 is an accumulator chamber of the high clutch accumulator 44. Connected to a portion of the hydraulic fluid line 55 disposed upstream of the neutral valve 45 is the reverse inhibitor valve 46. This inhibitor valve 46 is fluidly disposed in a manual valve hydraulic fluid line 57 and is opened in response to the hydraulic pressure within that portion of the hydraulic fluid line 55 disposed upstream of the neutral valve 45.

In order to electronically control engagement of the high clutch 21, the hydraulic fluid line 55 is connected via an orifice 55a to the hydraulic fluid line 54, and a hydraulic drain line 64 is connected to the hydraulic fluid line 55 at the portion disposed upstream of the neutral valve 45. The hydraulic drain line 64 has a drain port which is closed or opened by the high clutch duty solenoid 43. When it is deenergized (OFF), the high clutch duty solenoid 43 closes the drain port of the hydraulic drain line 64. When it is energized (ON), the high clutch duty solenoid 43 opens the drain port of the hydraulic drain line 64. The hydraulic pressure within the hydraulic fluid line 55, namely the activating hydraulic pressure for the high clutch 21, is controlled by varying duty ratio which the high clutch duty solenoid 43 operates on. This duty ratio is varied by a microcomputer based control unit, not shown.

The hydraulic control system operates as follows:

When it is placed at the P position or N position, the manual valve 35 drains the hydraulic fluid lines 56 and 57. Thus, the forward/reverse switch detector valve 48 assumes the position as illustrated by the lower half thereof viewing in FIG. 1, draining the low clutch 13 to release the same. At this time, the shift motor 41 shifts the shift command valve 40 to the overstroke position as illustrated by the upper half thereof viewing in FIG. 1. In this overstroke position, the shift command valve 40 drains the hydraulic fluid line 60, thus allowing the line pressure to act on the regulator valve 32. The lock-up solenoid valve 38 is deenergized (OFF), causing the torque converter 6 to operate in the converter state thereof. The shift control valve 42 also assumes an overstroke position wherein the hydraulic fluid line 54 is allowed to communicate with a drain port 42a and thus the driver pulley cylinder chamber 8b is drained. Since the hydraulic fluid line 56 is drained, the neutral valve 45 assumes the position as illustrated by the lower half thereof viewing in FIG. 1, allowing the portion of the hydraulic fluid line 55 downstream of the neutral valve 45 and thus the high clutch 21 to be drained. As a result, the driver pulley cylinder chamber 8b is drained and the high clutch 21 is released. Under this condition, no rotation is transmitted from the input shaft 1 to the output shaft 3.

When it is shifted to the D position, the manual valve 35 allows the throttle pressure within the hydraulic fluid line 53 to appear in the hydraulic fluid line 56, urging the shift valve 47 for leftward movement viewing in FIG. 1. This movement of the shift valve 47 causes the shift fork 15 to move the coupling sleeve (see FIG. 2) to the forward F position. After the shift valve 47 has shifted to the position as illustrated by the lower half thereof, the hydraulic fluid line 62 is allowed to communicate with the hydraulic fluid line 56, causing the forward/reverse switch detector valve 48 to assume the position as illustrated by the lower half thereof viewing in FIG. 1. When it assumes the position as illustrated by the lower half thereof, the forward/reverse switch detector valve 48 allows the line pressure within the hydraulic fluid line 63 to activate the low clutch 13. The shift motor 41 holds the shift command valve 40 and the shift control valve 42 at their overstroke positions, respectively. Thus, the relationship between the V-belt 10 and the driver and follower pulleys 8 and 9 remains unchanged and held in the same state as it was with the manual valve 35 held in the P or N position, and the high clutch 21 is left released. As a result, transmission of rotation to the output shaft 3 via the gears 11 and 16, and one-way clutch 17 is made possible, enabling the vehicle to move forward. Under this condition, the torque converter 6 operates in the converter state since the lock-up control valve 37 assumes the position as illustrated by the lower half thereof owing to the solenoid valve 38 being energized (ON).

Figure 5:
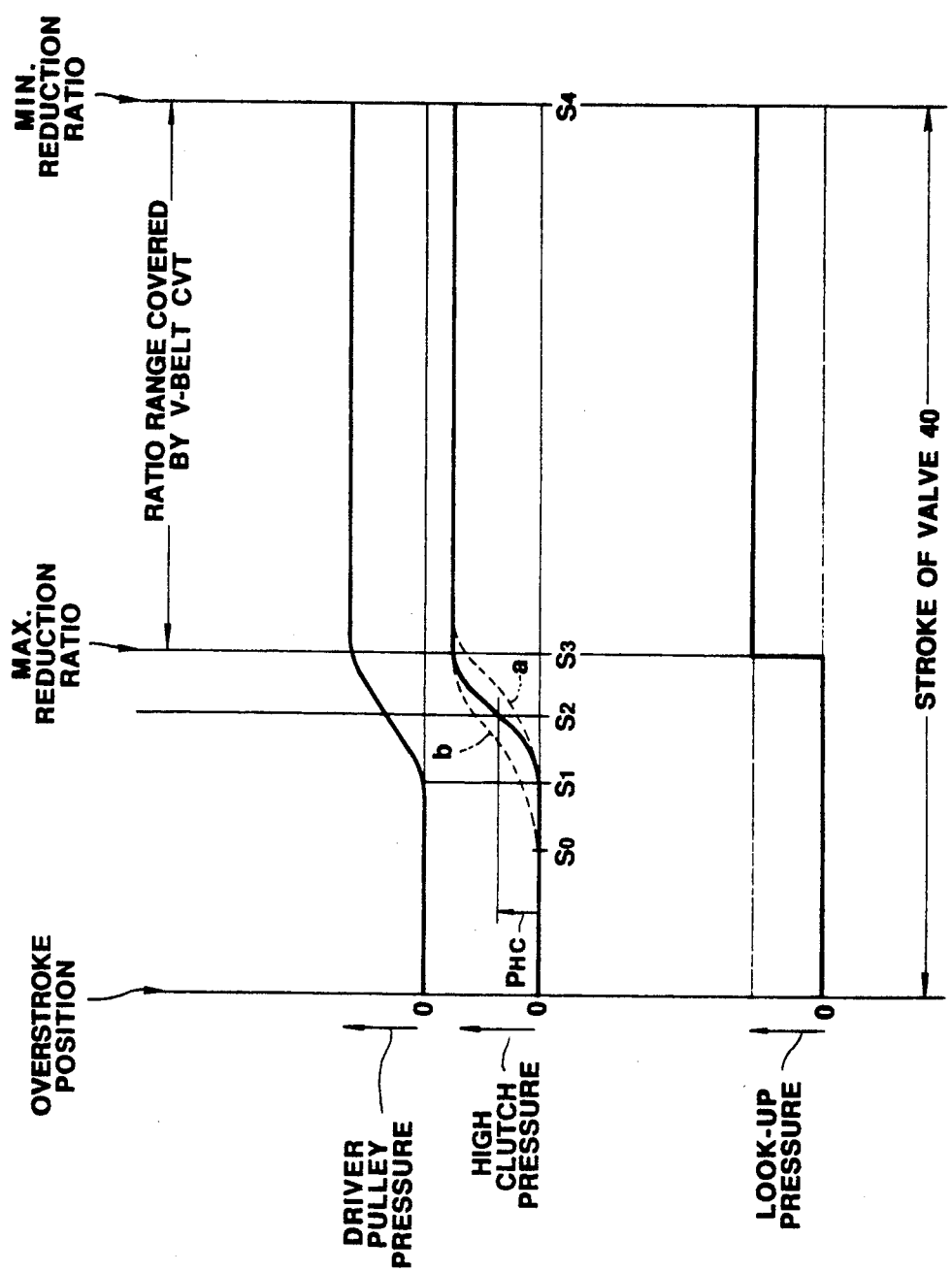
FIG. 5 is a graphical representation of variations of different hydraulic fluid pressures versus the stroke of a spool of a valve 40.

After the vehicle has started moving forward, the stepper motor 41 displaces the shift command valve 40 to the left, viewing in FIG. 1, from the overstroke position as illustrated by the upper half thereof in response to varying running state as being represented, for example, by an engine load. Under this condition, the hydraulic fluid line 60 is allowed to communicate with the hydraulic fluid line 59. Thus, the level of the line pressure generated by the regulator valve 32 is varied in response to a change between the lock-up state of the torque converter and the converter state thereof owing to the ON and OFF of the lock-up solenoid valve 38. Referring also to FIG. 5, when it has stroked to a position $S_1$, the shift control valve 42 assumes the position as illustrated by the lower half thereof viewing in FIG. 1. As the shift control valve 42 displaces to the left, viewing in FIG. 1, beyond the position as illustrated by the lower half thereof, an opening degree with which the hydraulic fluid 54 communicates with the line pressure line 51 increases. During this process, the hydraulic fluid pressure within the driver pulley cylinder chamber 8b increases at a rate as illustrated by the fully drawn curve in FIG. 5. Using this hydraulic fluid pressure within the hydraulic fluid line 54, a hydraulic fluid pressure within the hydraulic fluid line 55 is regulated under the control of the high clutch duty solenoid 43. The rate of increase in the hydraulic fluid line 55 can be varied by varying the duty ratio with which the high clutch duty solenoid 43 operates. In this embodiment, the duty ratio is varied to allow the hydraulic fluid pressure within the hydraulic fluid line 55 to increase at a relatively slow rate as illustrated by the broken line curve a in FIG. 5. This hydraulic fluid pressure within the hydraulic fluid line 55 is supplied to the high clutch 21 since the neutral valve 45 assumes the position as illustrated by the upper half thereof owing the presence of the hydraulic fluid pressure within the hydraulic fluid line 56. When the hydraulic fluid pressure supplied to the high clutch 21 reaches a predetermined value $P_{HC}$, the high clutch 21 is engaged, thus allowing the rotation to be transmitted from the input shaft 1 to the output shaft 3 also via the V-belt 10, high clutch 21, and gears 20 and 19. Since the maximum or largest reduction ratio provided by this power train including the V-belt 10 is smaller than a reduction ratio provided by the gears 11 and 16, the one-way clutch 17 starts freewheeling immediately after the high clutch 21 is engaged, and thus a quick shift to the power train including the V-belt 10 is made.

An increase in the hydraulic fluid pressure with in the driver pulley cylinder chamber 8b causes an effective diameter with which the V-belt 10 contacts with the driver pulley 8 to increase, thus initiating continuously variable shift in reduction ratio. Under the control of the shift motor 41, the shift command valve 41 and thus shift control valve 52 stroke between two positions $S_3$ and $S_4$ so as to provide an optimum reduction ratio for running state which the vehicle is involved in. Under this condition, the solenoid 38 is energized (ON) to hold the lock-up control valve 37 at the position as illustrated by the upper half thereof in FIG. 1, rendering the torque converter 6 operable in the lock-up state.

The above-mentioned shift owing to the engagement of the high clutch 21 is made without any substantial shock owing to the gradual increase in the hydraulic fluid pressure within the high clutch 21 as illustrated by the broken line curve a and the function of the high clutch accumulator 44.

Upon emergency braking causing the driving wheel to tend to lock, the duty ratio with which the duty solenoid 43 operates is increased to 100%. This causes the drain line 64 of the hydraulic fluid line 55 to be opened, draining the hydraulic fluid line 55 to drop the hydraulic fluid acting on the high clutch 21 to zero immediately. Thus, the transmission of rotation to the output shaft 3 through the V-belt 10 becomes zero, avoiding excessive wear of the V-belt 10.

When the manual valve 35 is placed at the R position, the throttle pressure within the hydraulic fluid line 53 is admitted to the hydraulic fluid line 57. Under this condition, the shift command valve 40 and shift control valve 42 assume the overstroke positions, respectively, under the control of the stepper motor 41. Owing to the the shift control valve 42 being at the overstroke position, the driver pulley cylinder chamber 8b is drained and the high clutch 21 is released. Since no hydraulic fluid pressure is present in the hydraulic fluid line 55, the reverse inhibitor valve 46 assumes the position as illustrated by the lower half thereof viewing in FIG. 1, opening the hydraulic fluid line 57. Thus, the throttle pressure admitted to the hydraulic fluid line 57 urges the shift valve 47 to move to the right, viewing in FIG. 1, to the reverse (R) position. This causes the coupling sleeve 14 (see FIG. 2) to take the reverse (R) position and the hydraulic fluid line 62 to communicate with the hydraulic fluid line 57. Since the forward/reverse switch detector valve 48 is biased by the throttle pressure within the hydraulic fluid line 62 to assume the position as illustrated by the upper half thereof viewing in FIG. 1, the line pressure within the hydraulic fluid line 63 is supplied after being subject to pressure regulation at the forward/reverse switch detector valve 48 to the low clutch 13. The engagement of the low clutch 13 allows the rotation to be transmitted from the input shaft 1 to the output shaft 3 via the low clutch 13, coupling sleeve 14, reverse gear 12, idler gear 18 and output gear 19. This causes the vehicle to move in the reverse direction.

Although not shown in FIG. 1, movement of the shift command valve 40 is transmitted to the shift control valve 42 and also to the regulator valve 32 owing to the action of a shift operating mechanism which is well known and illustrated at a reference numeral 112 in the before mentioned U.S. Pat. No. 895,552 which is hereby incorporated by reference in its entirety.

Since, in the embodiment just described, the hydraulic fluid line 55 is connected via the orifice 55a to the hydraulic fluid line 54, it is impossible to initiate a pressure build-up within the hydraulic fluid line 55 before a pressure build-up within the hydraulic fluid line 54. Thus, it is impossible to engage the high clutch 21 until the hydraulic fluid pressure within the hydraulic fluid line 54 reaches the predetermined value $P_{TH}$.

Figure 4:
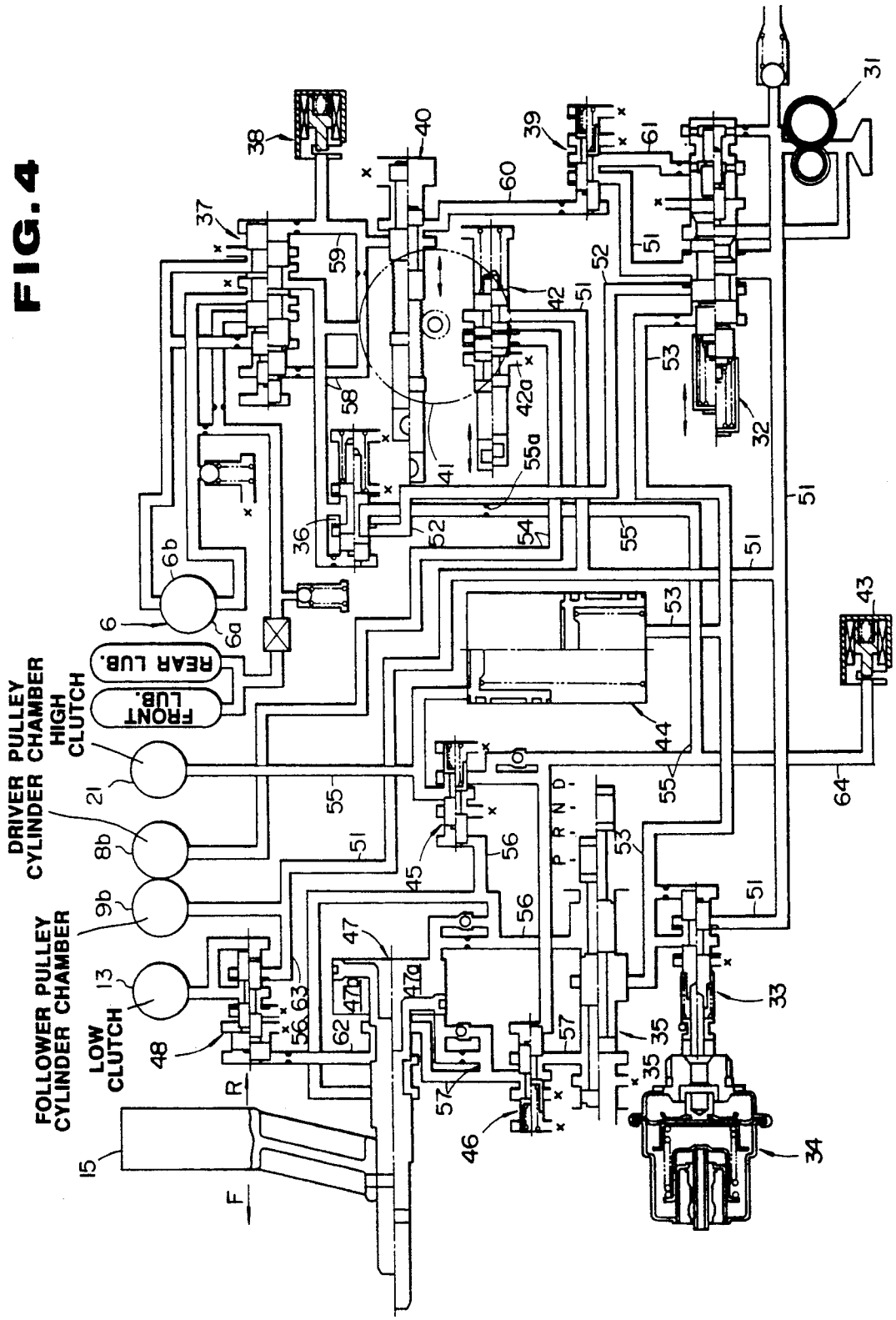
FIG. 4 is a similar view to FIG. 1 but illustrating a second embodiment.

Referring to FIG. 4, a second embodiment is described. This second embodiment is designed to solve the above-mentioned inconvenience encountered in the first embodiment. With exception of the following feature, the second embodiment is substantially the same as the first embodiment. In this second embodiment, a hydraulic fluid line 55 is connected via an orifice 55a to a hydraulic fluid line 58 where a converter hydraulic pressure generated by a torque converter regulator valve 36 is always present. The hydraulic pressure is always higher than a predetermined value $P_{TH}$ at which a high clutch 21 is brought into engagement. In the second embodiment, under the control of a high clutch duty solenoid 43, a pressure build-up within the high clutch 21 is initiated is set at an instance $S_0$ which is prior to an instance $S_1$ at which a pressure build-up within a hydraulic fluid line 54 is initiated (see a broken line curve b in FIG. 5).

Thus, the high clutch 21 is engaged well before the continuously variable ratio change begins owning to the pressure build-up within a driver pulley cylinder chamber 8b. As a result, a shock inherent with this shift involving the engagement of the high clutch is reduced to a sufficiently low level since engagement of the high clutch 21 takes place well before initiation of the continuously variable ratio change.

The present invention may also be applied to a hybrid continuously variable transmission which has a power train including a gearing mechanism providing a reduction ratio smaller than the minimum or smallest reduction ratio provided by another power train including a continuously variable transmission mechanism.

The present invention may also be applied to a hybrid continuously variable transmission including as a gearing mechanism a change speed gearing mechanism.

What is claimed is:

1. A control system for a hybrid continuously variable transmission, the hybrid continuously variable transmission including a gearing mechanism combined with a continuously variable transmission mechanism, the hybrid continuously variable transmission also including a first clutch and a second clutch, wherein when the first clutch is engaged with the second clutch engaged, a second power train is established by the continuously variable transmission mechanism, the control system comprising:
    means for generating a hydraulic pressure;
    means for defining a hydraulic fluid line having one end connected to said hydraulic pressure generating means and an opposite end connected to the second clutch;
    an orifice means, located in said hydraulic fluid line, for restricting hydraulic fluid flow communication between said hydraulic pressure generating means and said hydraulic fluid line;
    means for defining a hydraulic drain line having one end connected to said hydraulic fluid line and end with a drain port; and
    electronically controlled means for controlling an opening degree of said drain port without interrupting fluid flow through said hydraulic fluid line.

2. A control system as claimed in claim 1, wherein said hydraulic pressure generating means is connected to a driver pulley cylinder chamber of the continuously variable transmission mechanism.

3. A control system as claimed in claim 2, wherein said hydraulic pressure generating means includes a shift control valve.

4. A control system as claimed in claim 1, wherein said hydraulic pressure generating means is connected to a torque converter of the hybrid continuously variable transmission.

5. A control system as claimed in claim 4, wherein said hydraulic pressure generating means includes a torque converter regulator valve.

6. A control system as claimed in claim 1, wherein the first clutch is a low clutch, and the second clutch is a high clutch.

7. A control system as claimed in claim 1, wherein said electronically controlled means includes a duty solenoid.

8. Hybrid continuously variable transmission:
a continuously variable transmission mechanism;
a gearing mechanism combined with said continuously variable transmission mechanism;
a high clutch;
a low clutch;
said high clutch and low clutch being constructed and arranged such that when said high clutch is engaged with said low clutch disengaged, a first power train is established by said gearing mechanism, while when said low clutch is engaged, a second power train is established by said continuously variable transmission mechanism;
means for generating a hydraulic pressure;
a hydraulic fluid line having one end connected to said hydraulic pressure generating means and an opposite end connected to said high clutch;
an orifice means, located in said hydraulic fluid line, for restricting hydraulic fluid flow communication between said hydraulic pressure generating means and said hydraulic fluid line;
a hydraulic drain line having one end connected to said hydraulic fluid line and an opposite end with a drain port; and
electronically controlled means for controlling an opening degree of said drain port without interrupting fluid flow through said hydraulic fluid line, said electronically controlled means regulating the fluid pressure level in said hydraulic fluid line and said second clutch during normal operation of the vehicle and rapidly draining said hydraulic fluid line and said second clutch during panic bracking.

9. A hybrid continuously variable transmission as recited in claim 8, wherein said electronically controlled means includes a duty solenoid which normally closes said drain port but which is selectively operative to cyclically open and close said drain port.

* * * * *